United States Patent [19]

Giessner

[11] 4,065,975

[45] Jan. 3, 1978

[54] APPARATUS FOR MEASURING THE SLIP OF LOCOMOTIVE WHEELS AND PREVENTING SLIDING THEREOF

[75] Inventor: Jean Giessner, Villneuve le Comte, France

[73] Assignee: BBC Brown Boveri & Company Limited, Baden, Switzerland

[21] Appl. No.: 695,539

[22] Filed: June 14, 1976

[30] Foreign Application Priority Data

June 13, 1975 Switzerland .......................... 7669/75

[51] Int. Cl.² .............................................. G01P 3/56
[52] U.S. Cl. ........................................ 73/510; 73/511
[58] Field of Search ..................... 73/510, 511, 517 R; 303/104; 246/182 C; 324/161

[56] References Cited

U.S. PATENT DOCUMENTS

| 3,299,834 | 1/1967 | Hughson | 303/104 |
| 3,362,757 | 1/1968 | Marcheron | 303/104 |
| 3,398,994 | 8/1968 | Smith | 303/104 |

Primary Examiner—James J. Gill
Attorney, Agent, or Firm—Pierce, Scheffler & Parker

[57] ABSTRACT

Apparatus provided for measuring slippage of locomotive wheels and for preventing excessive sliding of the wheels and which produces a control signal for governing the locomotive speed uses as a basic criteria the variation in velocity between the translatory speed of the locomotive and the circumferential velocity of sliding wheels. Variation in velocity is measured by integrating acceleration differences between the effective acceleration of the locomotive and the wheel acceleration.

6 Claims, 12 Drawing Figures

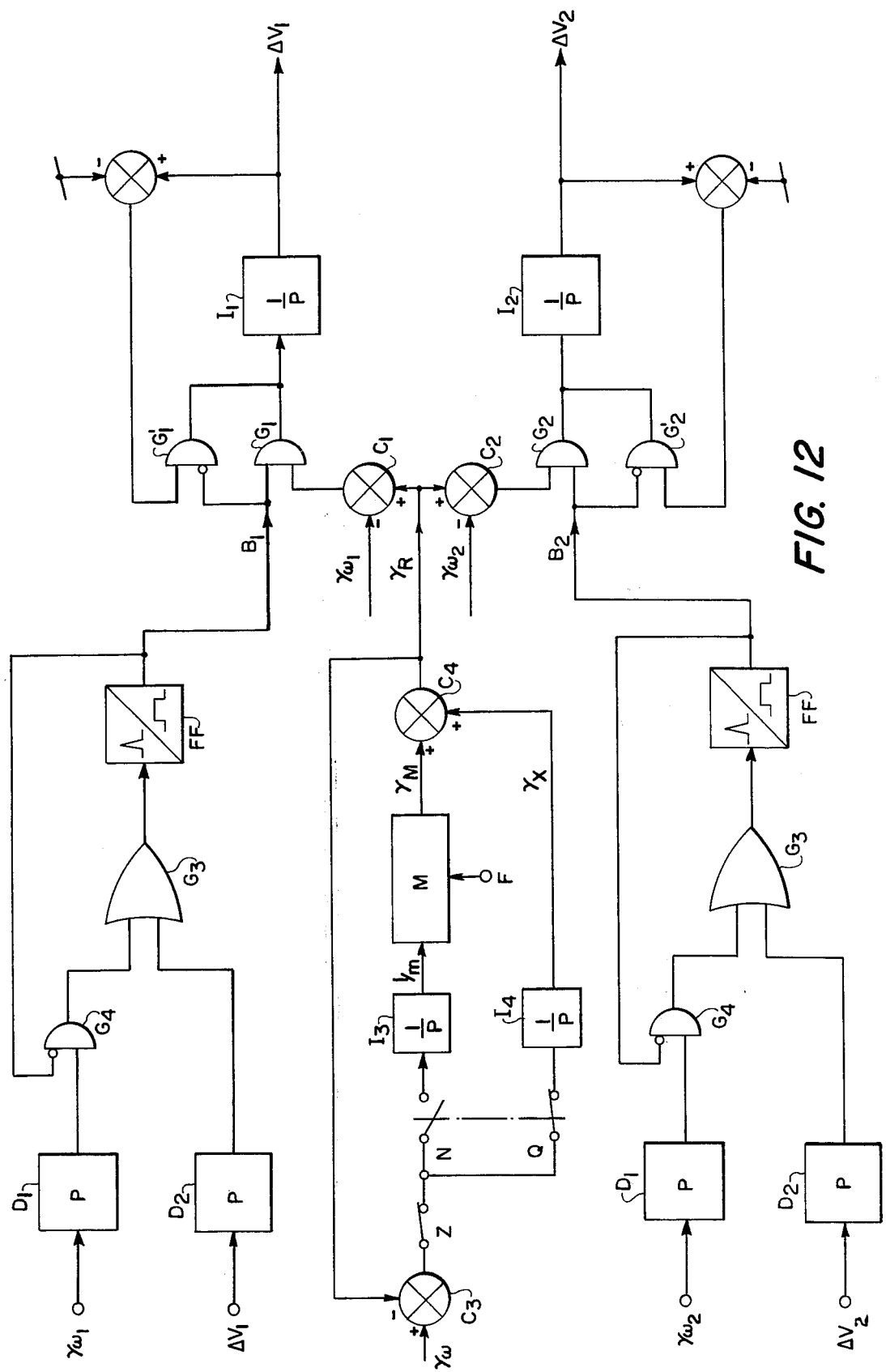

APPARATUS FOR MEASURING THE SLIP OF LOCOMOTIVE WHEELS AND PREVENTING SLIDING THEREOF

The invention concerns an apparatus to measure the slipping, and to prevent the excessive sliding (of the wheels) of a locomotive, where there is being determined, and utilized for governing the speed of the locomotive, the effective variation in velocity between translatory speed of the locomotive and circumferential velocity of sliding wheels.

The two revolving bases of a locomotive are pulling independently of each other. Whenever the adhesion of the wheels to the rails becomes poor, slipping will occur. Such slipping can be of minor or major magnitude, and when a certain critical value is reached, one speaks of excessive sliding, meaning that the wheels will race away, and that the traction load will become almost zero.

In order to overcome this deficiency, a power governor determines the slipping compatible with the conditions of the rails in order to maintain optimum tensile load.

Such governor is controlled in functional relation to the measured wheel velocities, but in order to attain a satisfactorily precise functioning of such governor it becomes necessary to take into account also the difference in velocity between the circumferential velocity of the sliding wheel and its speed over the rail. This difference can be obtained simply by comparing the angular velocity of a wheel of a sliding revolving base with the angular velocity of a non-sliding base. However, in case of poor adhesion to the rails it will very often happen that both revolving bases of the locomotive are sliding, and it will then become impossible to determine the variation in velocity by a simple comparison.

It is therefore necessary to establish, as function of several parameters, a velocity which corresponds to the velocity of a non-sliding revolving base in order to arrive at the effective variation in velocity by a comparison. This is the problem to be solved by the invention.

The invention solves the problem in that manner that the variations in velocity are measured by integrating the acceleration differences between the effective acceleration of the locomotive and the relevant wheel acceleration by means of feeding the acceleration differences into appropriate integrators, that the measuring system in case of the absence of slipping is blocked by proper means, that for this purpose each revolving base of the locomotive is monitored by a detector which will register the beginning of slipping for this specific base and which will generate a signal to cancel the blocking, that there are provided additional means to measure the second differentiation of the wheel velocity, as well as a flip-flop circuit which is actuated upon the occurrence of this second differentiation and which will remain in this state for several seconds to allow the velocity variation of the revolving base concerned to assume its proper value if there exists any effective slipping, that the effective acceleration of the locomotive is determined by means of a system with coupling loop, whereby a signal is fed into a comparator that corresponds to the measured acceleration of one wheel and the output signal of the entire system is fed back to the second input of the comparator, and that between the output of the comparator and the output of the entire system the following circuit components are placed in series:
1. A switch that is closed in the absence of slipping and that is being opened when slipping occurs,
2. An integrator with output storage,
3. A multiplier circuit which receives at its second input a signal that is derived from the motor current of the locomotive and that is proportional to its tractive power, whereby the system is in balance when the switch is closed, that is in the absence of slipping, which means that the measured acceleration of the wheel is equal to the effective acceleration of the locomotive, the value appearing at the output of the multiplier, this acceleration being equal to the tractive power multiplied by the reciprocal value of the mass, so that at the input to the multiplier circuit, or at the output store of the integrator respectively, a signal will appear that is proportional to the reciprocal value of the mass, and whereby in case of the switch being in open position, at the beginning of slipping, this signal will remain at the output of the integrator, being stored at the output store, so that at the output of the entire system there will appear a signal, even in case of slipping or excessive sliding, that is proportional to the effective acceleration of the locomotive.

The invention will be explained in detail later on by use of the drawings wherein:

FIG. 12 is a circuit diagram illustrating the complete system, this being essentially a composite of the sub-circuits illustrated in FIGS. 2, 3, and 10.

Figure 1:
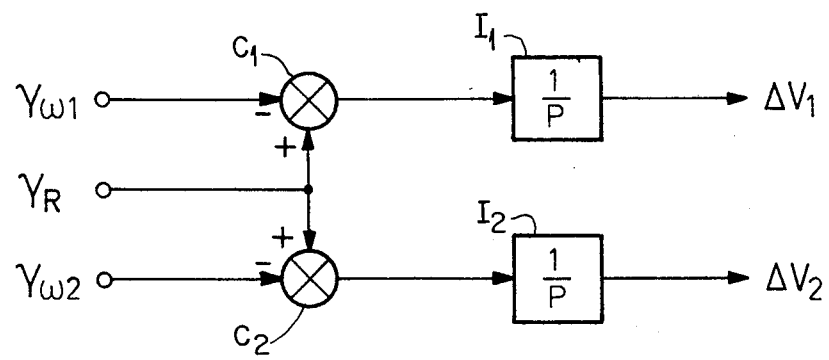
FIG. 1 is a sub-circuit diagram illustrating an arrangement for obtaining the velocity variation of two revolving bases of the locomotive.

However, before describing in detail the circuits shown in the drawings, it is believed that the following discussion of the principle involved in obtaining the velocity variation $\Delta V$ will be helpful.

This velocity variation is simply the difference between the effective speed $V_R$ of the locomotive and the circumferential velocity $V_\omega$ of the wheel:

$$\pm \Delta V = V_R - V_\omega.$$

It can also be stated that the velocity variation is represented by the integral of the difference between the effective acceleration $\Xi_R$ of the locomotive and of the acceleration $\gamma_\omega$ of the wheel:

$$\pm \Delta V = \int (\gamma_R - \gamma_\omega)\, dt.$$

It is the latter formula which is being utilized, and in order to obtain the velocity variation for each revolving base it is therefore only necessary to determine the value of effective acceleration, that is $\Delta V_1$ for the revolving base 1 and $\Delta V_2$ for the revolving base 2. FIG. 1 shows a diagram illustrating the practical application of this operation: the differences $\gamma_R - \gamma_{\omega 1}$ and $\gamma_R - \gamma_{\omega 2}$ are formed in suitable comparators $C_1$, $C_2$ and are integrated by means of associated integrators $I_1$, $I_2$, thus producing the corresponding velocity variations $\Delta V_1$ and $\Delta V_2$.

Figure 2:
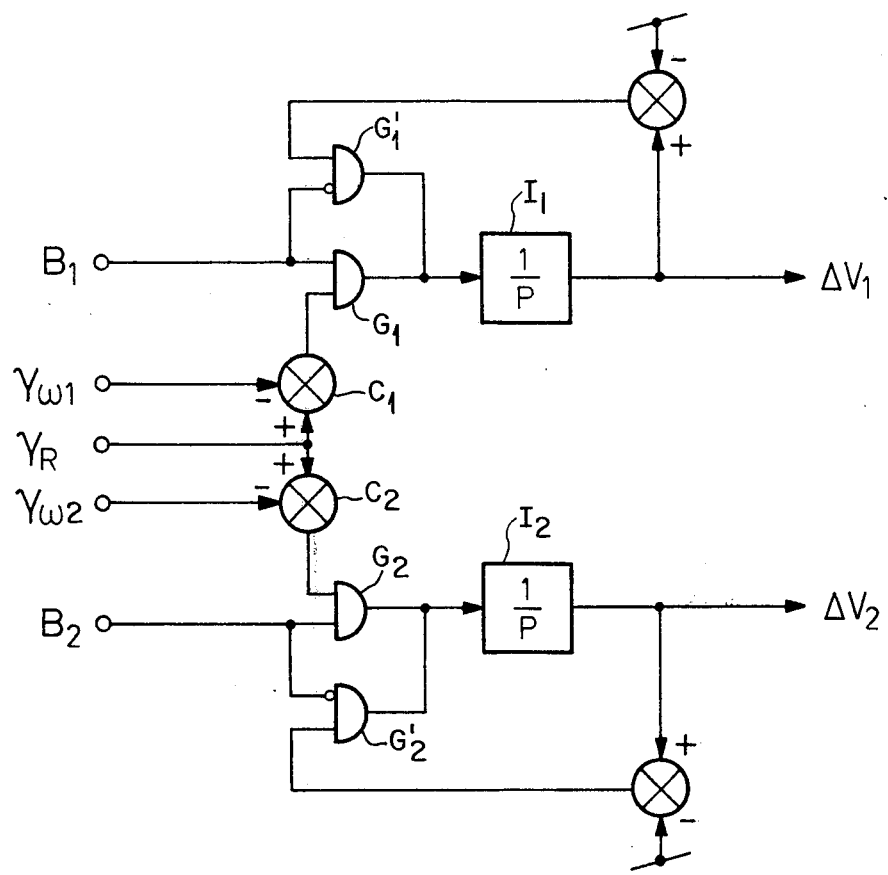
FIG. 2 is a sub-circuit diagram similar to FIG. 1 but which also incorporates an arrangement for blocking the system under no-slip conditions of the revolving bases.

In view of the fact that the precise determination of the effective acceleration $\gamma_R$ of the locomotive relative to time is a rathr difficult matter (as will be explained later on) it will be expedient to block the system when there is no slipping. For this purpose a detector is used to monitor each revolving base which will register the beginning of slipping, furnishing data $B_1$ for the revolving base 1 and data $B_2$ for the revolving base 2. FIG. 2 shows a diagram which includes these improvements. If data $B_1$ and/or $B_2$ are present, the signals $\gamma_R - \gamma_{\omega 1}$, or $\gamma_R - \gamma_{\omega 2}$ respectively, will reach by way of proper AND gates $G_1$, $G_2$ the respective integrators $I_1$, $I_2$, and at their outputs there will again (as in FIG. 1) appear the velocity variations i.e., the accelerations $\Delta V_1$ and $\Delta V_2$ respectively. The auxiliary AND-gate $G'_1$, $G'_2$, respectively assigned to each AND-gate $G_1$, $G_2$, respectively having a negated input, is blocked in this specific case. However, if there is no $B_1$ data generated (no slipping), the signal $\gamma_R - \gamma_{\omega 1}$ can not reach the integrator $I_1$ because the AND-gate $G_1$ is blocked; but the associated (auxiliary) AND-gate $G'_1$ with a negated input is now open and insures in connection with the illustrated diagram that $\Delta V_1$ -and likewise $\Delta V_2$, if there exists no slipping at the revolving base 2 either- will maintain a value of zero.

Figure 3:
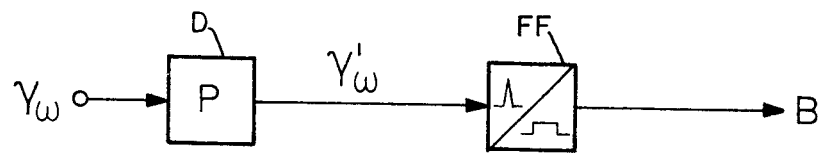
FIG. 3 is a sub-circuit diagram utilized to obtain a signal indicative of the beginning of wheel slip.

The principle of the operation of the slipping detectors will now be discussed. Any change in acceleration requires careful attention because it can be due either to a change in acceleration power as initiated in the matter of course by the locomotive engineer, or it can be due to the beginning of slippage. A very responsive measurement of the second differentiation $\gamma'$ of the wheel velocity will therefore solely indicate the possibility of slipping. This information, which can be very transitory, will activate a time-base circuit that will remain in its new state for a few seconds so that the $\Delta V$ of the revolving base involved (see above) can assume its proper value if there is any slippage. FIG. 3 shows the basic diagram for obtaining the data B, indicating the beginning of slipping. The wheel-acceleration signal $\gamma_\omega$ reaches the differentiator D, and the differentiation $\gamma'_\omega$ (that is the second differentiation of the wheel velocity $V_\omega$) will actuate a flip-flop circuit FF, with the signal B appearing at its output end.

Evidently this flip-flop circuit remains in its position during the time when there is any change in the wheel acceleration $\gamma_\omega$ and it can return to its original position only a few seconds after the last change of $\gamma_\omega$.

Figure 4:
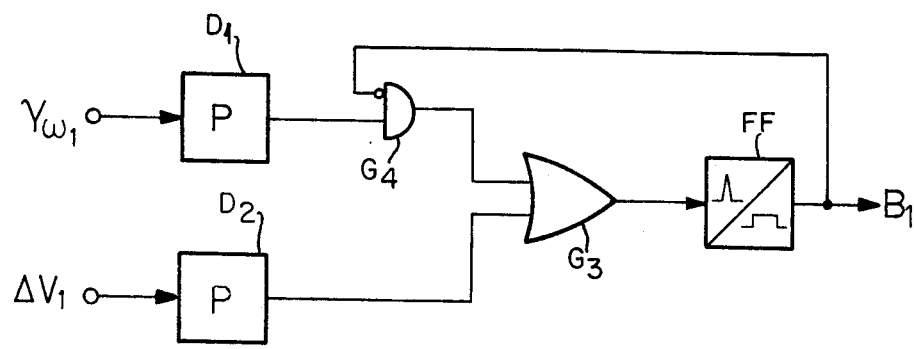
FIG. 4 is a sub-circuit diagram utilized to block the wheel slip signal.

FIG. 4 illustrates the complete diagram for the blocking of the signal B. An OR-gate $G_3$ first receives the differentiation of the signal $\gamma_{\omega 1}$, formed in a differentiator $D_1$, by way of an AND-gate $G_4$, its second input being inverted. Since $B_1$ is initially zero, this AND-gate will allow the signal $\gamma'_{\omega 1}$ to pass through to the flip-flop circuit by way of the OR-element. However, immediately upon the activation of the flip-flop circuit the inverted input of the AND-gate becomes a low-pass area; this AND-gate will then not pass the signal $\gamma'_{\omega 1}$ any longer -if it is still present- , but the signal $(\Delta V_1)'$ differentiated in the differentiator $D_2$ and applied to OR-gate $G_3$ will now take over the task of maintaining the flip-flop circuit FF in its set state.

The determination of the effective acceleration $\gamma_R$ of the locomotive (an acceleration which definitely need not be identical with the wheel acceleration in case of slipping or excessive sliding) is the major problem to be solved by the method proposed by the invention, as already emphasized previously. By the integration of the difference $\gamma_R - \gamma_\omega$ ($\gamma_\omega$ = circumferential acceleration of the wheel) there is being obtained the velocity variation $\Delta V$, as described above.

The determination of the effective acceleration $\gamma_R$ is based on the known mechanical relation $$F = mY, \text{ or } Y = \frac{F}{m}, \text{ or } \frac{1}{m} = \frac{Y}{F} \qquad (1),$$

where F represents the force,
$m$ the mass
and
$\gamma$ the acceleration.

Figure 5:
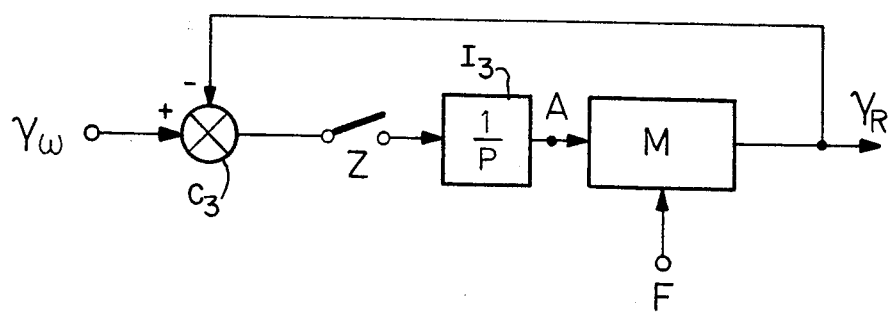
FIG. 5 is a circuit diagram of one embodiment for obtaining the effective acceleration of the locomotive in relation to wheel acceleration for slip and no-slip conditions.

In FIG. 5 there is illustrated the system using a feedback, where $\gamma_\omega$ represents the wheel acceleration, $\gamma_R$ the effective acceleration, and M a multiplier circuit.

a. If there is no slipping, Z will be closed. The system is in balance if $\gamma_\omega = \gamma_R$, i.e., if the integrator $I_3$ delivers a correct value at point A. Therefore,
$\gamma_R = F \cdot A = \gamma_\omega.$ In order to satisfy the equation (1), the value of A can only be $1/m$ so that $$Y_R = F \cdot \frac{1}{m} = Y_\omega.$$

Thus, point A furnishes information concerning the mass.

b. During the period of time when there is any slipping, Z will be open. Although $\gamma_\omega$ may assume various values, point A can not change anymore (due to the storage effect at the output of the integrator), and since it represents the reciprocal of the mass, the result will always be the effective acceleration as function of the force:

$\gamma_R = F \cdot (1/m).$

The signal F, which is proportional to the force, can be derived from the motor current of the locomotive.

c. Influence of the change in track profile: A change in profile of the track over which the train is being driven (up or down grade) is equivalent to a change in mass.

Figure 6:
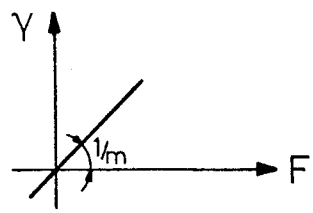
FIG. 6 is a graph showing effective acceleration of the locomotive as a function of force for a given mass when the track is level.

FIG. 6 depicts, in case of a level profile, the effective acceleration as function of the force for a given mass. The slope of the straight line (tangent) is given by $\gamma_R/F$, which according to formula (1) equals the reciprocal $1/m$ of the mass.

Figure 7:
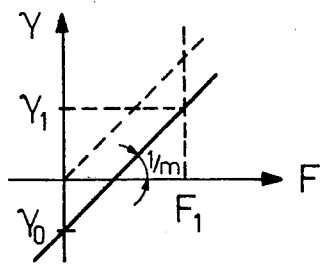
FIG. 7 is a graph showing a negative locomotive acceleration (deceleration) for an upgrade track condition.

If there exists an up-grade, FIG. 7 demonstrates that a negative acceleration (deceleration) - $\gamma_o$ corresponds to the force zero, and an acceleration $\gamma_1 = (F_1/m) - \gamma_o$ corresponds to the force $F_1$.

Figure 8:
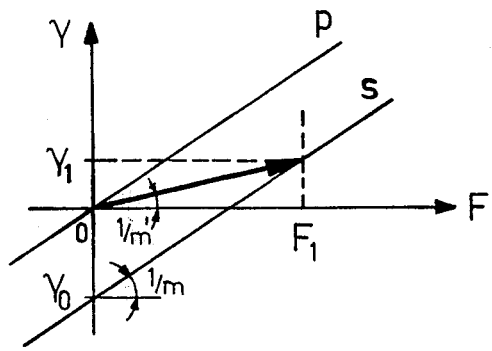
FIG. 8 is a graph combining the graphs of FIGS. 6 and 7, graph $p$ denoting a level track profile and graph $s$ an upgrade profile.

FIG. 8 combines the two graphs (p denoting level-, and s up-grade profile). The measured acceleration is $\gamma_1$ for a force $F_1$, resulting in a mass reciprocal of $1/m'$, (instead of $(1/m)$ where $m$ represents the true mass. This is a disadvantageous situation because it affects the accuracy because, if there is any slipping, the switch Z will open and (the value of) the mass $1/m'$) can not change anymore, and the force will lessen to correct the slipping situation, and the result will be an acceleration ranging between $\gamma_1$ and zero instead of the limit ranges $\gamma_1$ and $\gamma_o$. In order to overcome this problem, a more complex system is employed for obtaining the value $\gamma_o$, this value being denoted by $\gamma_x$.

Figure 9:
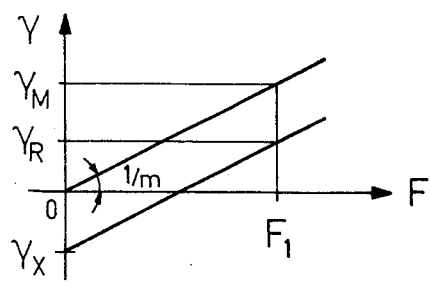
FIG. 9 is also a graph similar to FIG. 6 but for a downgrade track profile.

The same graphic illustration is being used again but the effective acceleration $\gamma_R$ represents here the sum of an acceleration $\gamma_M$ resulting from the tractive force acting upon the true mass and an acceleraton $\gamma_x$ due to the gravity acting upon the true mass in case of a down-grade track (see FIG. 9):

$$\gamma_R = \gamma_M \pm \gamma_x.$$

However, in case of an up-grade track the formula will read $$\gamma_R = \gamma_M - \gamma_x$$
$$\gamma_R = (F_1/m) - \gamma_x.$$

Figure 10:
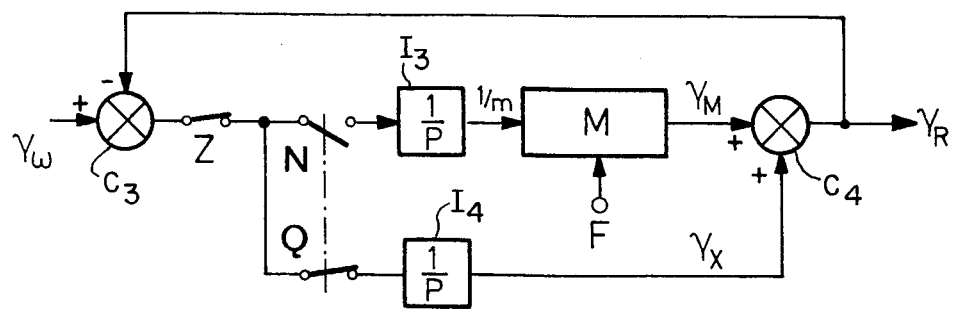
FIG. 10 is a circuit diagram similar to that of FIG. 4 but with the addition of an auxiliary modifying control as a function of any gravitational effect present.

FIG. 10 shows the arrangement in diagrammatic form. The following assumption is made here: if there is no slipping, any change in the acceleration $\gamma_\omega$ of the wheels is caused by the presence of a grade if there is no change in pulling force. Obviously, this assumption is concerned with a gradual change in acceleration which differs from the more rapid change caused by the beginning of slipping since in the latter case the system will be blocked by the opening of switch Z. Thus, any change of F will influence the reversing switch ("Inverter") N, Q (see FIG. 10). The system functions in the following manner:

1. At level profile.
   — the force increases, with $\gamma_x$ assumed to be zero. The reversing switch closes N, opens Q, and the system is "looped in", the condition shown by FIG. 5, in other words there is being obtained the true value of $1/m$ and $\gamma_M = \gamma_R = \gamma\omega$.
   — The force does not change anymore. The reversing switch opens N, closes Q, and the system is looped in by $\gamma_x$ by way of the output from integrator $I_4$ which forms one input to an adder $C_4$, the other input to which is constituted by the output from multiplier M. The output from adder $C_4$ is fed back as a negative input to a comparator $C_3$, the other input to the latter being positive and representative of wheel acceleration. The output from comparator $C_3$ is connected to one contact of switch Z. This means, since $\gamma_M = \gamma_\omega$, that $\gamma_x$ maintains its zero value. This method makes it possible to activate the storage for $(1/m)$ if there is any change of F.

2. If the profile is not level.
   — The force does not change, and N is therefore open and Q closed. The acceleration $\gamma_\omega$ changes due to the downgrade, and the system reacts in that $\gamma_x$ will bring the loop into balance:

$$\gamma_M + \gamma_x = \gamma_R = \gamma_\omega.$$

— The force changes, and N is closed, Q open. The value of $\gamma_x$ can not change anymore and corresponds to the acceleration as caused by the down-grade. Due to these circumstances the desired aim is accomplished and $\gamma_M$ becomes solely a function of the pulling force and of the true mass.

Comment: Any change in profile requires a change in pulling force if the locomotive engineer intends to maintain a constant speed of the train. There are three possibilities to be considered.
   — The change in force is accomplished prior to the change in profile, and $\gamma_x$ is thereafter stored correctly.
   — The change in force is accomplished after the change in profile, and $\gamma_x$ is already correctly stored at this time.
   — The change in force is accomplished simultaneously with a change in profile. This is the most difficult case since $\gamma_x$ is now not stored correctly. In order to overcome this problem in part, it will be necessary for the change in force $(dF/dt)$, actuating the reversing switch, to have a greater magnitude for the reversal of this switch than the magnitude needed to balance out any standard downgrades so far as speed is concerned. This problem case can be treated still more advantageously if the system is restricted to the changes of forces which are in the direction of increase, thus eliminating the down-grade profiles where $dF/dt$ is decreased for the purpose of maintaining a constant speed.

Figure 11:
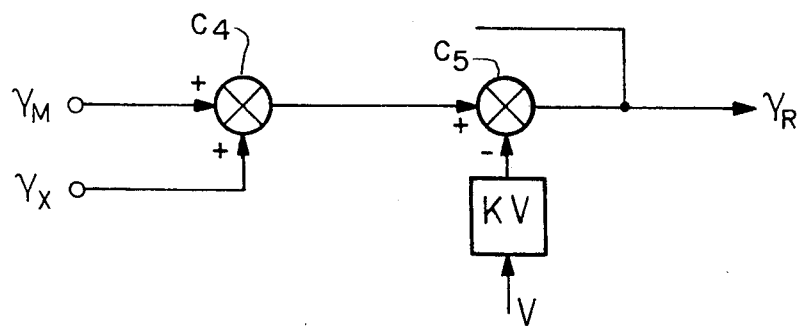
FIG. 11 is a sub-circuit diagram showing an arrangement for introducing negative acceleration as a function of speed into the circuit of FIG. 10.

Finally, it is necessary to take into consideration the resistance encountered during the forward movment, a resistance which will depend on the magnitude of the speed. It will suffice here to introduce into the coupling loop a negative acceleration as a fucntion of the speed (see FIG. 11). In order to determine the force required in connection with the above described system, it will only be necessary to measure the total amperage and the characteristic curve pulling force/speed of the locomotive power plant.

Obviously, the values so measured can be used directly for the actuation of governors with immediate action relative to the motor and an automatic lowering of the pulling force so that it will remain below a certain critical value.

It should finally be mentioned that heretofore a potentiometer had been used permitting a variation of the speed amplification factor (compensation for the wear and tear of the wheel tires). Test drives were necessary to adjust this apparatus protecting against excessive sliding. Such test drives are very difficult to carry out within larged-sized urban areas. The above proposed protection against excessive sliding makes such test drives unnecessary, thus cutting down on personnel and increasing gainful output.

I claim:

1. Apparatus for measuring wheel slip and to prevent excessive sliding of the wheels of a locomotive and which produces a control signal in accordance with the variation in velocity between translatory speed of the locomotive and the circumferential velocity of sliding sheels, said control signal being used for governing the speed of the locomotive, said apparatus comprising:

a system including a coupling loop for determining the effective acceleration of the locomotive, said system comprising a comparator into one input of which is fed a signal corresponding to the acceleration of a wheel and wherein the output signal from said system is fed back to the other input of said comparator and wherein the following seriately connected circuit components are included between said comparator and the output of said system.

1. a switch which opens only in the event of wheel slip, 2. an integrator with output storage, 3. a multiplier having one input thereof connected to the output store of said integrator and to the other input of which is connected a signal derived from the locomotive motor current and which is proportional to its pulling force, said system being in balance when said switch is in its closed state and which is indicative of an effective acceleration of the locomotive equal to that of the wheel acceleration, means for integrating the difference between a signal representing the output from said system by which the effective acceleration of the locomotive is obtained and a signal representative of wheel acceleration to produce said control signal for governing the speed of the locomotive;

and means for blocking transmission of said difference signal to said integrating means in the absence of wheel slip.

2. Apparatus as defined in claim 1 wherein said means for blocking transmission of said difference signal to said integrating means in the absence of wheel slip includes means for obtaining the second derivative of the wheel velocity and a flip-flop circuit actuated by said second derivative to a state in which it remains set for a time sufficient to permit the variation in wheel velocity to assume its proper value in a case where wheel slip is present.

3. Apparatus as defined in claim 2 wherein said flip-flop circuit actuated by said second derivative of the wheel velocity is maintained in said set state by the first derivative of the wheel velocity variation.

4. Apparatus as defined in claim 3 for maintaining said flip-flop circuit in said set state by the first derivative of the variation in wheel velocity comprising an OR-gate having its output connected to the input side of said flip-flop circuit, one input to said OR-gate being constituted by the first derivative of the variation in wheel velocity and the other input to said OR-gate being constituted by the output from an AND-gate, one input to said AND-gate being constituted by the second derivative of the wheel velocity and other input thereto being inverted and constituted by the output from said flip-flop circuit.

5. Apparatus as defined in claim 1 and which further includes means introducing into said coupling loop a negative acceleration signal which is a function of speed of the locomotive for taking into consideration any resistance opposing its forward movement.

6. Apparatus as defined in claim 1 and which further includes a second switch connected between the first mentioned switch and the input to said integrator, an adder component having as one input thereto the output from said multiplier and as the other input thereto the output from a second integrator, the input to said second integrator being connected by way of a third switch to a junction point in the circuit between said first mentioned and second switches, said second and third switches being jointly controlled by a change in the locomotive pulling force such that one of said two switches is open while the other one is closed and vice versa, the output from said adder component being fed back as a second and negative input to said comparator and also constituting the effective acceleration of the locomotive equal to the sum of primary acceleration caused by the pulling force exerted on the true mass and a supplemental gravity induced positive or negative acceleration component.

* * * * *